US012713324B2

(12) United States Patent
Lu et al.

(10) Patent No.: US 12,713,324 B2
(45) Date of Patent: Aug. 18, 2026

(54) WIRELESS COMMUNICATION METHOD, FIRST TERMINAL, AND COMMUNICATION DEVICE

(71) Applicant: GUANGDONG OPPO MOBILE TELECOMMUNICATIONS CORP., LTD., Dongguan (CN)

(72) Inventors: Qianxi Lu, Dongguan (CN); Boyuan Zhang, Dongguan (CN); Bingxue Leng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 215 days.

(21) Appl. No.: 18/405,650

(22) Filed: Jan. 5, 2024

(65) Prior Publication Data

US 2024/0137833 A1 Apr. 25, 2024

Related U.S. Application Data

(63) Continuation of application No. PCT/CN2021/105029, filed on Jul. 7, 2021.

(51) Int. Cl.
*H04W 40/02* (2009.01)
*H04L 1/1867* (2023.01)

(52) U.S. Cl.
CPC ............ *H04W 40/02* (2013.01); *H04L 1/189* (2013.01)

(58) Field of Classification Search
CPC ..... H04W 40/02; H04W 80/02; H04W 88/04; H04W 76/14; H04W 76/15; H04W 40/22; H04L 1/189; H04L 1/08
See application file for complete search history.

(56) References Cited

U.S. PATENT DOCUMENTS 11,219,054 B2 1/2022 Gulati
2018/0324842 A1 11/2018 Gulati et al.
2019/0239279 A1* 8/2019 Shi ........................ H04W 80/02
2019/0253915 A1* 8/2019 Joseph .................. H04W 80/08
2020/0245113 A1 7/2020 Kang et al.
2021/0153063 A1* 5/2021 Zhang ................... H04W 88/04
2021/0336732 A1* 10/2021 Shi ........................ H04L 5/0044
2021/0345356 A1 11/2021 Fan et al.
2021/0352525 A1* 11/2021 Hong .................... H04L 1/1614
(Continued)

FOREIGN PATENT DOCUMENTS

CN 110574476 A 12/2019
CN 111447678 A 7/2020
(Continued)

OTHER PUBLICATIONS

Supplementary European Search Report issued on Jul. 4, 2024 for European Patent Application No. 21948794.9.
(Continued)

*Primary Examiner* — Phirin Sam
*Assistant Examiner* — Mang Boi Thawng
(74) *Attorney, Agent, or Firm* — Ladas & Parry, LLP

(57) ABSTRACT

A wireless communication method, a first terminal, and a communication device are disclosed. The method includes: a first message is received, the first message being used for instructing the first terminal to use at least one path among multiple paths to perform data transmission; and data transmission is performed based on the at least one path.

14 Claims, 3 Drawing Sheets

(56) References Cited

U.S. PATENT DOCUMENTS

2022/0015184 A1* 1/2022 Wu ........................ H04L 1/0015
2024/0040426 A1 2/2024 Zhang
2024/0049099 A1* 2/2024 Yao ..................... H04W 36/033
2024/0178947 A1* 5/2024 Teyeb ................... H04W 88/04
2024/0224371 A1* 7/2024 Zhang ................... H04W 76/15

FOREIGN PATENT DOCUMENTS

WO 2021006691 A1 1/2021
WO 2021098804 A1 5/2021
WO 2021099359 A1 5/2021
WO 2023279296 A1 1/2023

OTHER PUBLICATIONS

International Search Report for International Application No. PCT/CN2021/105029, mailed on Mar. 28, 2022., with the English translation provided by WIPO.
Written Opinion of the International Search Authority for International Application No. PCT/CN2021/105029, mailed on Mar. 28, 2022, with the English translation provided by WIPO.

* cited by examiner

WIRELESS COMMUNICATION METHOD, FIRST TERMINAL, AND COMMUNICATION DEVICE

CROSS-REFERENCE TO RELATED APPLICATION

This is a continuation of International Application No. PCT/CN2021/105029 filed on Jul. 7, 2021, the disclosure of which is hereby incorporated by reference in its entirety.

BACKGROUND

End-to-end communication refers to a communication from a terminal to a terminal, such as a Vehicle to Vehicle (V2V) communication, a Vehicle to Everything (V2X) communication, a Device to Device (D2D) communication, and so on. Specifically, a transmitting end transmits a Direct Communication Request (DCR) message to a receiving end, and if the receiving end responds to the DCR message, the receiving end and the transmitting end can communicate directly. In addition, a relay-based terminal-to-network relay function is introduced in the 3rd Generation Partnership Project (3GPP). Specifically, a relay terminal with a relay function transfers data between a remote terminal and a network, and the remote terminal and the relay terminal are connected through a sidelink. However, the communication efficiency of the relay-based terminal-to-network is too low.

Therefore, how to improve the communication efficiency of the remote terminal is an urgent problem to be solved in the field.

SUMMARY

Embodiments of the disclosure relate to the field of communication, and provide a wireless communication method, a first terminal and a communication device, which can improve the communication efficiency of the first terminal and the reliability of data transmission.

In a first aspect, the present disclosure provides a wireless communication method. The method includes the following operations.

A first message is received, and the first message is configured for instructing a first terminal to perform data transmission using at least one path in a plurality of paths.

The data transmission is performed based on the at least one path.

In a second aspect, the present disclosure provides a wireless communication method. The method includes the following operation.

A first message transmitted, and the first message is configured for instructing a first terminal to perform data transmission using at least one path in a plurality of paths.

In a third aspect, the present disclosure provides a first terminal configured to perform the method in the first aspect or various implementations thereof. Specifically, the first terminal includes functional modules for performing the method in the first aspect or various implementations thereof.

In an implementation, the first terminal may include a processing unit. The processing unit is configured to perform functions related to information processing. For example, the processing unit may be a processor.

In an implementation, the first terminal may include a transmitting unit and/or a receiving unit. The transmitting unit is configured to perform functions related to transmission, and the receiving unit is configured to perform functions related to reception. For example, the transmitting unit may be a transmitter and the receiving unit may be a receiver. For another example, the first terminal is a communication chip, the receiving unit may be an input circuit or interface of the communication chip, and the transmitting unit may be an output circuit or interface of the communication chip.

In a fourth aspect, the present disclosure provides a communication device configured to perform the method in the second aspect or various implementations thereof. Specifically, the communication device includes functional modules for performing the method in the second aspect or various implementations thereof.

In an implementation, the communication device may include a processing unit. The processing unit is configured to perform functions related to information processing. For example, the processing unit may be a processor.

In an implementation, the communication device may include a transmitting unit and/or a receiving unit. The transmitting unit is configured to perform functions related to transmission, and the receiving unit is configured to perform functions related to reception. For example, the transmitting unit may be a transmitter and the receiving unit may be a receiver. For another example, the communication device is a communication chip, the receiving unit may be an input circuit or interface of the communication chip, and the transmitting unit may be an output circuit or interface of the communication chip.

In an implementation, the communication device is a second terminal or a network device.

In a fifth aspect, the present disclosure provides a first terminal including a processor and a memory. The memory is configured to store a computer program, and the processor is configured to call and run the computer program stored in the memory to perform the method in the first aspect or various implementations thereof.

In an implementation, the number of the processor is one or more and the number of the memory is one or more.

In an implementation, the memory may be integrated with the processor, or the memory may be arranged separately from the processor.

In an implementation, the first terminal further includes a transmitter and a receiver.

In a sixth aspect, the present disclosure provides a communication device including a processor and a memory. The memory is configured to store a computer program, and the processor is configured to call and run the computer program stored in the memory to perform the method in the second aspect or various implementations thereof.

In an implementation, the number of the processor is one or more and the number of the memory is one or more.

In an implementation, the memory may be integrated with the processor, or the memory may be arranged separately from the processor.

In an implementation, the communication device further includes a transmitter and a receiver.

In a seventh aspect, the present disclosure provides a chip for performing the method in any one of the first aspect and the second aspect or various implementations thereof. Specifically, the chip includes a processor. The processor is configured to call and run a computer program from a memory, to cause a device installed with the chip to perform the method in any one of the first aspect and the second aspect or various implementations thereof.

In an eighth aspect, the present disclosure provides a computer-readable storage medium for storing a computer program. The computer program causes a computer to perform the method in any one of the first aspect and the second aspect or various implementations thereof.

In a ninth aspect, the present disclosure provides a computer program product including computer program instructions. The computer program instructions cause a computer to perform the method in any one of the first aspect and the second aspect or various implementations thereof.

In a tenth aspect, the present disclosure provides a computer program. The computer program, when run on a computer, causes the computer to perform the method in any one of the first aspect and the second aspect or various implementations thereof.

Based on the above technical solutions, data transmission is performed based on at least one path in a plurality of paths, thereby improving the communication efficiency of the first terminal. In addition, the first message is designed to instruct the first terminal to use at least one of the plurality of paths for data transmission, to enable the first terminal to determine the at least one path to be used, and further enable a PDCP entity of the first terminal to perform data transmission based on the at least one determined path, thus improving the reliability of the data transmission.

DETAILED DESCRIPTION

The technical solutions in embodiments of the disclosure will be described below in combination with the appended drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

It should be understood that the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced LTE system, a New Radio (NR) system, an evolution system of the NR system, a LTE-based access to unlicensed spectrum (LTE-U) system, a NR-based access to unlicensed spectrum (NR-U) system, a Universal Mobile Telecommunications System (UMTS), a Wireless Local Area Network (WLAN), Wireless Fidelity (WiFi), a next generation communication system or other communication systems, etc. In addition, the present disclosure may also be applied to a Device to Device (D2D) communication, a Machine to Machine (M2M) communication, a Machine Type Communication (MTC), a Vehicle to Vehicle (V2V) communication, and the like. Alternatively, the communication system in the embodiments of the present disclosure may be applied to a Carrier Aggregation (CA) scenario, a Dual Connectivity (DC) scenario, or a Standalone (SA) network deployment scenario.

Figure 1:
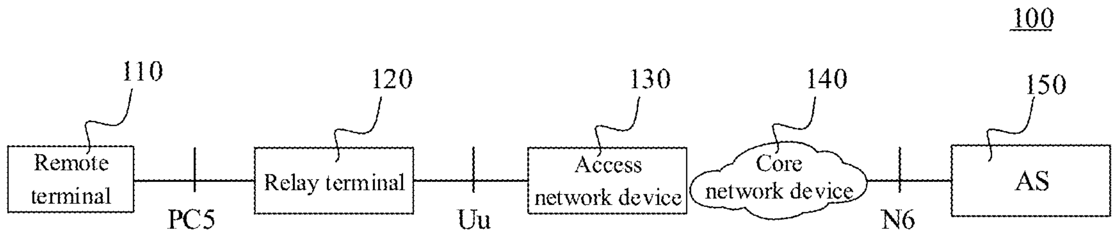
FIG. 1 is an example of a system framework provided by an embodiment of the present disclosure.

FIG. 1 is an example of a system framework provided by the present disclosure.

As illustrated in FIG. 1, the system framework 100 may include a remote terminal 110, a relay terminal 120, an access network device 130, a core network device 140, and an application server (AS) 150.

As an example, the remote terminal 110 and the relay terminal 120 may be terminal devices that have been authenticated through a network when the terminal devices are within coverage of the network. The remote terminal 110 may be a terminal device authenticated to access a wireless network through the relay terminal, in other words, the remote terminal 110 may be authorized to be a remote user equipment (UE). The relay terminal 120 may be a terminal device authenticated to operate as a relay node. Both the remote terminal 110 and the relay terminal 120 may be authorized to transmit and receive messages related to relay discovery, and the messages related to the relay discovery may include a discovery message and a discovery request message.

The remote terminal 110 and the relay terminal 120 may be any device or apparatus configured with a physical layer and a media access control layer. The terminal device may also be referred to as an access terminal, such as, a User Equipment (UE), a user unit, a user station, a mobile station, a mobile radio station, a remote station, a remote terminal, a mobile device, a user terminal, a terminal, a wireless communication device, a user agent or a user apparatus. The access terminal may be a cellular telephone, a cordless telephone, a Session Initiation Protocol (SIP) telephone, a Wireless Local Loop (WLL) station, a Personal Digital Assistant (PDA), a handheld device having a wireless communication function, a computing device or other linear processing device connected to a wireless modem, an on-board/vehicle-mounted device, a wearable device, or the like. The embodiments of the disclosure are described by taking the on-board terminal as an example, but are not limited thereto.

In some embodiments of the present disclosure, the remote terminal 110 may support an end-to-end protocol stack. The end-to-end protocol stack may include a Packet Data Convergence Protocol (PDCP) layer for the 3GPP PC5 interface and an upper protocol layer above the PDCP layer, and the upper protocol layer may include a user plane protocol layer and a control plane protocol layer. The user plane protocol layer includes, but is not limited to, a Service Data Adaptation Protocol (SDAP) layer and an Internet Protocol (IP) layer, and the control plane protocol layer includes, but is not limited to, a Radio Resource Control (RRC) layer and a Non-Access Stratum (NAS).

In some embodiments of the present disclosure, the remote terminal 110 and the relay terminal 120 may support a point-to-point protocol stack, and the point-to-point protocol stack may include Layer 2 (L2) and Layer 1 (L1) protocol stacks for the 3GPP PC5 interface. The L1 and L2 protocol stacks include, but are not limited to, a Radio Link Control (RLC) layer, a Media Access Control (MAC) layer, and a Physical (PHY) layer.

In addition, the relay terminal 120 may be provided with a relay protocol layer. The function of the relay protocol layer may be used to transmit data packets and related control information between remote terminals through the relay terminal.

For example, the relay protocol layer may be a terminal-to-network relay function based on relay of Layer 3 used for delivering control messages, such as the IP layer, the RRC layer and the NAS layer. That is, the remote terminal accesses the network through the relay terminal with a Layer 3 relay function, for example, the relay terminal has an IP layer relay function. Specifically, the relay terminal with the Layer 3 relay function transmits data between the remote terminal and the network, and the remote terminal and the relay terminal are connected through a sidelink.

For another example, the relay protocol layer may be a terminal-to-network relay function based on relay of Layer 2, and the Layer 2 is used to provide proper transmission and reception of signaling messages, including partial duplicate detection. For example, the Layer 2 may include a MAC layer, a RLC layer, and a PHY layer. That is, the remote terminal accesses to the network through the relay terminal with a Layer 2 relay function, and the relay terminal has the functions below the Access Stratum (AS) and the RLC layer. Similar to Rel-13ProSe, the relay terminal with the Layer 2 relay function transmits data between the remote terminal and the network, and the remote terminal and the relay terminal are connected through a sidelink.

In the framework 100, the remote terminal (remote UE) 110 may access the network device 130 through the relay terminal 120. Specifically, the remote terminal 110 and the relay terminal 120 may be connected or communicated through the PC5 interface of the 3GPP system. The relay terminal 120 and the network device 130 may also be connected or communicated through a Uu interface of the 3GPP system.

In some embodiments of the present disclosure, the remote terminal 110 or the relay terminal 120 may also be referred to as a user equipment, an access terminal, a user unit, a user station, a mobile station, a mobile radio station, a remote station, a remote terminal, a mobile device, a user terminal, a terminal, a wireless communication device, a user agent or a user apparatus, etc. The terminal device may be a STAION (ST) in a WLAN, a cellular telephone, a cordless telephone, a SIP telephone, a WLL station, a PDA device, a handheld device having a wireless communication function, a computing device or other processing device connected to a wireless modem, an on-board device, a wearable device, and a next generation communication system, such as a terminal device in the NR network or a terminal device in a future evolved Public Land Mobile Network (PLMN) network.

In some embodiments of the present disclosure, the remote terminal 110 or the relay terminal 120 may also be a wearable device. The wearable device, also referred to as a wearable intelligent device, is a generic term of wearable devices obtained by performing intelligent design and development on daily wearing products by using the wearable technology, such as glasses, gloves, watches, clothes, and shoes. The wearable device is a portable device directly worn or integrated to clothes or accessory of a user. The wearable device not only is a hardware device but also realizes powerful functions by software support, data interaction, and cloud interaction. Generalized wearable intelligent devices include full-featured, large size and complete or partial functions realized without relying on smart phones, such as smart watches or smart glasses, and includes only a certain application function, which is necessary to be used in conjunction with other devices such as a smart phone, such as various smart bracelets for monitoring physical signs, or smart jewelry and the like.

In some embodiments of the present disclosure, the access network device may be an Evolutional Node B (eNB or eNodeB) in a Long Term Evolution (LTE) system, a Next Generation Radio Access Network (NG RAN) device, a base station (gNB) in an NR system, or a wireless controller in a Cloud Radio Access Network (CRAN). The network device 120 may also be a relay station, an access point, an on-board equipment, a wearable device, a hub, a switch, a bridge, a router, or a network device in a future evolved Public Land Mobile Network (PLMN), etc.

In some embodiments of the present disclosure, the core network device 140 may be a 5G Core (5GC) device, for example, an Access and Mobility Management Function (AMF), for another example, an Authentication Server Function (AUSF), for another example, a User Plane Function (UPF), and for another example, a Session Management Function (SMF). Alternatively, the core network device 140 may also be an Evolved Packet Core (EPC) device in the LTE network, for example, a Session Management Function+Core Packet Gateway (SMF+PGW-C) device. It should be understood that SMF+PGW-C may simultaneously achieve the functions that SMF and PGW-C may perform. During the evolution of the network, the core network device may also be called other names, or a new network entity may be formed by dividing the functions of the core network, which is not limited by the embodiments of the present disclosure.

As an example, assuming that the access network device 130 is an NG RAN device, the core network device 140 is a 5GC device, the remote terminal 110 may be connected to the relay terminal 120 through a PC5 interface, and the relay terminal 120 may be connected to the access network device 130 through a Uu interface, thereby being connected to the core network device 140. The core network device 140 is connected to the AS 150 through an N6 interface.

The framework 100 may also be applied to other 3GPP communication systems, such as a 4G communication system or a future 3GPP communication system, which is not limited in the present disclosure. In addition, in the embodiments of the present disclosure, the application server (AS) in FIG. 1 may also be another terminal device or an external public security Internet.

It should be understood that each device having a communication function in the network/system in the embodiments of the present disclosure may be referred to as a communication device. Taking the communication system 100 illustrated in FIG. 1 as an example, the communication devices may include the network device 120 and the terminal device 110 having communication functions, and the network device 120 and the terminal device 110 may be the devices described above and will not be described herein. The communication devices may also include other devices in the communication system 100, such as a network controller, a mobility management entity and other network entities, which is not limited in the embodiments of the present disclosure.

It is to be understood that terms “system” and “network” in the disclosure may usually be exchanged. In the disclosure, the term “and/or” is only an association relationship describing associated objects and represents that three relationships may exist. For example, A and/or B may represent three conditions: independent existence of A, existence of both A and B, and independent existence of B. In addition, character "/" in the disclosure usually represents that previous and next associated objects form an "or" relationship.

Figure 2:
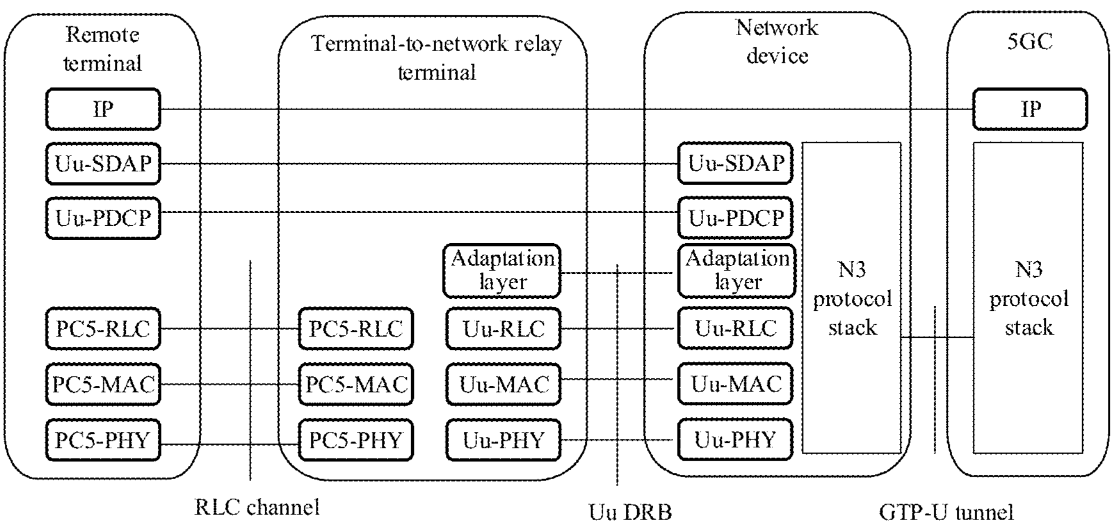
FIG. 2 is an example of a terminal-to-network relay based on Layer 2 provided by an embodiment of the present disclosure.

FIG. 2 is an example of a terminal-to-network relay based on Layer 2 provided by an embodiment of the present disclosure.

As illustrated in FIG. 2, in the terminal-to-network relay based on Layer 2 (i.e., L2 UE-to-network relay), an adaptation layer may be arranged on the Uu interface between the relay terminal and the network device and above the RLC layer. A Uu-SDAP, a Uu-PDCP, and RRC terminate between the remote terminal and the network device, while the RLC, MAC, and PHY terminate in each link, i.e., one or more links between the remote terminal and the relay terminal, and one or more links between the relay terminal and the network device.

For an uplink of the terminal-to-network relay based on Layer 2, the Uu adaptation layer of the relay terminal supports an uplink bearer mapping between accessed PC5-RLC channels for the relay terminal to perform relay on a Uu path and output from the Uu RLC channel. For an uplink relay service, different end-to-end bearers (SRB or DRB) of the same remote terminal and/or different remote terminals can perform N: 1 mapping and data multiplexing on a Uu-RLC channel.

In addition, the Uu adaptation layer may also be used for identification information of remote terminals supporting uplink services to multiplex data from a plurality of remote terminals. A Uu radio bearer of the remote terminal and identification information of the remote terminal are included in the uplink Uu adaptation layer, so that the network device associates received data packets of a particular PDCP entity associated with the Uu radio bearer of the remote terminal.

For a downlink of the terminal-to-network relay based on Layer 2, the Uu adaptation layer may be used to support downlink bearer mapping at a network device to map an end-to-end radio bearer (SRB or DRB) of the remote terminal to the Uu RLC channel on a Uu path through the relay terminal. The Uu adaptation layer may be used to support downlink N:1 bearer mapping and data multiplexing between multiple end-to-end radio bearers (SRBs or DRBs) of the remote terminal and/or different remote terminals and a Uu RLC channel on the Uu path of the relay terminal.

In addition, the Uu adaptation layer needs identification information of remote terminals supporting downlink services. The identification information of the Uu radio bearer of the remote terminal and the identification information of the remote terminal need to be put into the Uu adaptation layer through the network device at the downlink, so that the relay terminal maps the data packet received from the Uu radio bearer of the remote terminal to related PC5 RLC channel thereto.

It should be understood that whether an adaptation layer is supported at the PC5 interface between the remote terminal and the relay terminal is not specifically limited in the present disclosure. That is, the PC5 interface between the remote terminal and the relay terminal may or may not support the adaptation layer.

Figure 3:
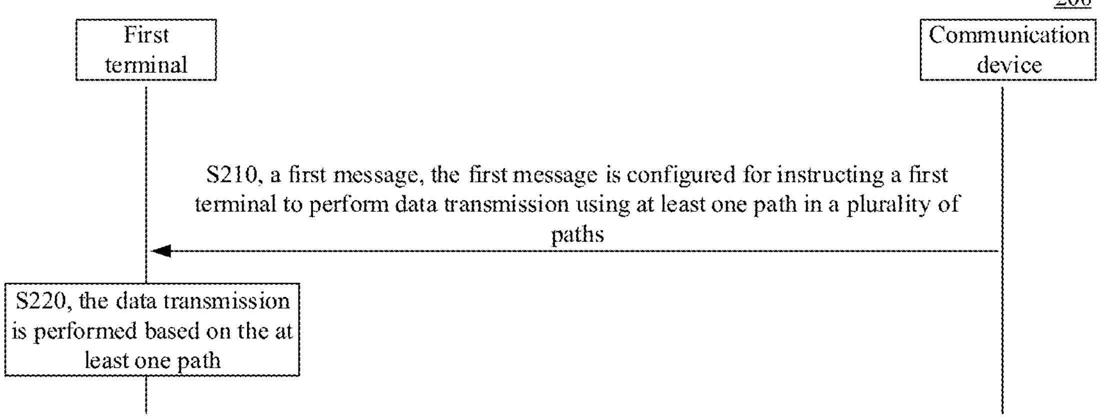
FIG. 3-FIG. 5 are schematic flowcharts of wireless communication methods provided by embodiments of the present disclosure.

FIG. 3 illustrates a schematic flowchart of a wireless communication method 200 according to an embodiment of the present disclosure. It should be understood that the method 200 may be performed interactively by a first terminal and a communication device. It should be noted that the method 200 may be applied to a relay scenario, and may also be applied to a non-relay scenario. Taking the method being applied to the relay scenario as an example, the first terminal illustrated in FIG. 3 may be the remote terminal as illustrated in FIG. 1, and the communication device illustrated in FIG. 3 may be the access network device or the relay terminal as illustrated in FIG. 1.

As illustrated in FIG. 3, the method 200 may include part of or all of the following contents.

At S210, a first message is received, and the first message is configured for instructing a first terminal to perform data transmission using at least one path in a plurality of paths.

At S220, the data transmission is performed based on the at least one path.

For example, after receiving the first message, the first terminal perform the data transmission based on the at least one path. For example, if the at least one path is at least two paths, the PDCP entity of the first terminal may perform data duplication transmission based on the at least two paths or perform non-duplication transmission.

Based on the technical solutions, data transmission is performed based on at least one of a plurality of paths, thereby improving the communication efficiency of the first terminal. In addition, the first message is designed to instruct the first terminal to use at least one of the plurality of paths for data transmission, to enable the first terminal to determine the at least one path to be used, and further enable a PDCP entity of the first terminal to perform data transmission based on the at least one determined path, thus improving the reliability of the data transmission.

It should be noted that the term "indication" in the embodiments of the present disclosure may be a direct indication, an indirect indication, or an indication of an associative relationship. For example, an indication of B by A may indicate that A directly indicates B, for example, B is obtained through A, or that A indirectly indicates B, for example, A indicates C and B is obtained through C, or that there is an association between A and B. In combination with the solution of the present disclosure, the first message indicating/instructing the first terminal to perform the data transmission using the at least one path in the plurality of paths may represents that the first message directly indicates the at least one path, for example, the at least one path may be obtained through the first message, may also represents that the first message indirectly indicates the at least one path, for example, the first message indicates other information, and the at least one path may be obtained through the other information, and may further represents that there is a correspondence or association between the first message and the at least one path.

In some embodiments, each of the at least one path is a connection path from the first terminal to a network device. In an embodiment, the plurality of paths includes a relay path and a direct connection path, the relay path is a path in which the first terminal is connected to the network device through a second terminal, and the direct connection path is a path in which the first terminal is directly connected to the network device. Alternatively, the plurality of paths only includes relay paths.

Taking the plurality of paths being two paths as an example, in an example, the plurality of paths may include one direct connection path and one relay path. As another example, the plurality of paths may include two relay paths. Certainly, the plurality of paths may be any number of the at least two paths, which are not specifically limited in the present disclosure.

In other words, the first message is used to indicate a path used for data transmission between the first terminal and the network device.

In some embodiments, each of the at least one path is a connection path from the first terminal to a second terminal.

In other words, the first message is used to indicate a path used for data transmission between the first terminal and the second terminal.

In other words, the specific implementation of the at least one path is not limited in the present disclosure. For example, the at least one path may be a connection path from the first terminal to the network device or a sidelink connection from the first terminal to the second terminal. Taking the plurality of paths including the relay path and the direct connection path as an example, the at least one path may only include the direct connection path, may only include the relay path, and may also include the direct connection path and the relay path at the same time. In addition, it should be understood that the first message in the present disclosure may be used to control the behavior of the PDCP entity of the first terminal. Taking the at least one path including both the direct connection path and the relay path as an example, the first message may be used to control the PDCP entity of the first terminal to map data to a bearer including a PC5 connection and a bearer (SRB or DRB) in which a PC5 connection is not included.

It should be noted that the direct connection path in the embodiments of the present disclosure may be understood as: the first terminal is directly connected to the network device, or there is a Uu connection between the first terminal and the network device, or the first terminal does not need to be connected to the network device through the second terminal. Similarly, the relay path may be understood as: the first terminal is indirectly connected to the network device, or there is a PC5 connection between the first terminal and the network device, or there is a second terminal between the first terminal and the network device, or the first terminal needs to be connected to the network device through the second terminal. Certainly, in other alternative embodiments, the relay path may also be referred to as the PC5 connection for short and the direct connection path may also be referred to as the Uu connection for short.

In some embodiments, the operation at S210 may include the following operation.

The first message transmitted by the network device is received.

For example, the first terminal receives the first message directly from the network device.

In some embodiments, the operation at S210 may include the following operation.

The first message transmitted by the second terminal is received.

In other words, the second terminal receives a second message transmitted by the network device, and the second message is configured for indicating a path used by the second terminal or the first terminal. The second terminal transmits the first message to the first terminal based on the second message.

It should be noted that the second message is used to indicate the path(s) to be used by the first terminal or the second terminal.

If the second message is used to indicate the path(s) to be used by the first terminal, i.e., the at least one path, the first message and the second message are the same. That is, the second terminal receives a message transmitted by the network device for indicating the at least one path and forwards the message to the first terminal. That is to say, the first message may be a message generated by the network device and forwarded to the first terminal through the second terminal.

If the second message is used to indicate the path(s) to be used by the second terminal, the second terminal needs to determine the at least one path to be used by the first terminal based on the second message. In other words, the second terminal needs to generate the first message based on the second message and transmit the first message to the first terminal. That is, the first message may also be a message generated by the second terminal. Equivalently, the second terminal does not forward a network command, but the network device controls the connection path from the relay to the network based on the second message, causing the second terminal expects the first terminal to control the connection path from the first terminal to the second terminal accordingly. In other words, if the second message is used to indicate the path(s) to be used by the second terminal, the at least one path includes at least a relay path controlled by the first terminal.

In some embodiments, the first message includes any one of: Radio Resource Control (RRC) signaling, a Packet Data Convergence Protocol (PDCP) Control Protocol Data Unit (PDU), a Radio Link Control (RLC) Control PDU, a Media Access Control (MAC) Control Element (CE), or Downlink Control Information (DCI).

In some embodiments, the first message includes any one of: PC5-RRC signaling, a PC5 PDCP Control PDU, a PC5 RLC Control PDU, a PC5 MAC CE, or Sidelink Control Information (SCI).

Figure 4:
Figure 4:
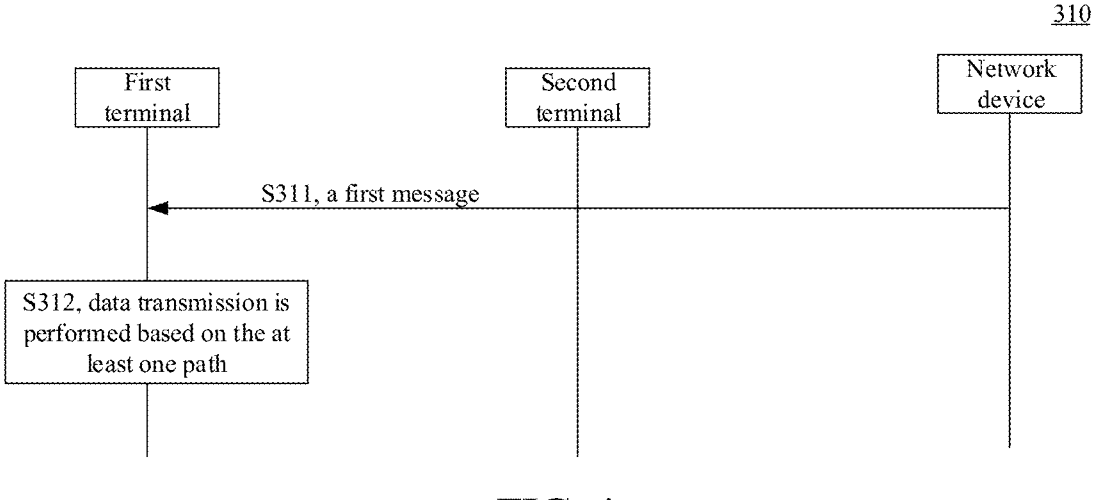

FIG. 4 is a schematic flowchart of a wireless communication method 310 provided by an embodiment of the present disclosure. It should be understood that the method 310 may be performed interactively by the first terminal and the network device. It should be noted that the method 310 may be applied to a relay scenario, and may also be applied to a non-relay scenario. Taking the method being applied to the relay scenario as an example, the first terminal illustrated in FIG. 4 may be the remote terminal as illustrated in FIG. 1, and the network device illustrated in FIG. 4 may be the access network device as illustrated in FIG. 1.

As illustrated in FIG. 4, the method 310 may include the following operations.

At S311, the first terminal receives a first message transmitted by a network device. The first message is configured for instructing the first terminal to perform data transmission using at least one path in a plurality of paths, and each of the at least one path is a connection path from the first terminal to the network device. The plurality of paths includes a relay path and a direct connection path. Taking the plurality of paths being two paths as an example, the plurality of paths may include one direct connection path and one relay path. Certainly, the plurality of paths may be any number of the at least two paths, which are not limited in the present disclosure. In an embodiment, the first message may be any one of: RRC signaling, a PDCP Control PDU, a RLC Control PDU, a MAC CE, or DCI.

At S312, the first terminal performs the data transmission based on the at least one path.

In the embodiment, there is a direct connection path between the first terminal and the network device. In such case, the network device can directly transmit the first message to the first terminal, so as to use the first message to control the PDCP entity of the first terminal to map data to a bearer including a PC5 connection and/or a bearer (SRB or DRB) including no PC5 connection, thereby realizing the data transmission based on the at least one path.

Figure 5:
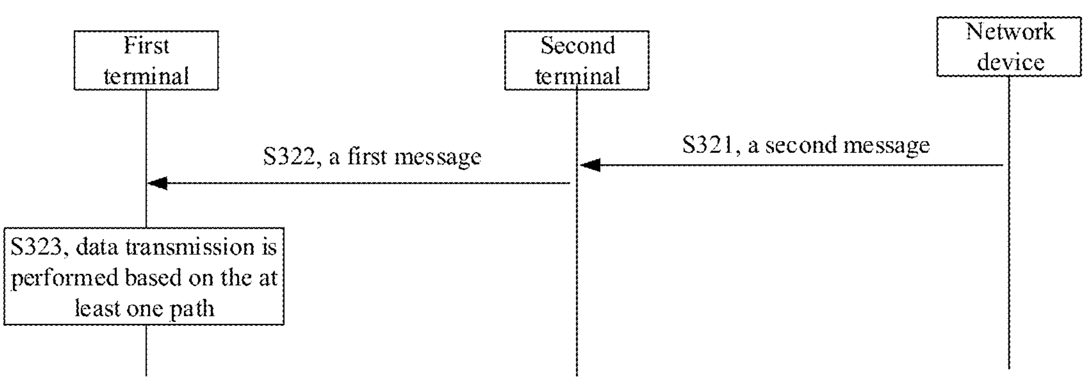

FIG. 5 is a schematic flowchart of a wireless communication method 320 provided by an embodiment of the present disclosure. It should be understood that the method 320 may be performed interactively by a first terminal, a second terminal and a network device. It should be noted that the method 320 may be applied to a relay scenario, and may also be applied to a non-relay scenario. Taking the method being applied to the relay scenario as an example, the first terminal illustrated in FIG. 5 may be the remote terminal as illustrated in FIG. 1, the second terminal illustrated in FIG. 5 may be the relay terminal as illustrated in FIG. 1, and the network device illustrated in FIG. 5 may be the access network device as illustrated in FIG. 1.

As illustrated in FIG. 5, the method 320 may include the following operations.

At S321, the second terminal receives a second message transmitted by the network device, and the second message is used to indicate a path(s) to be used by the first terminal or the second terminal. In an embodiment, the second message may be carried in any one of the following messages: RRC signaling, a PDCP Control PDU, a RLC Control PDU, a MAC CE, or DCI.

At S322, the first terminal receives a first message transmitted by the second terminal. The first message is used to instruct the first terminal to perform data transmission using at least one path in a plurality of paths, and each of the at least one path is a connection path from the first terminal to the network device. The plurality of paths includes a relay path and a direct connection path, or the plurality of paths only includes relay paths. Taking the plurality of paths being two paths as an example, the plurality of paths may include one direct connection path and one relay path. As another example, the plurality of paths may include two relay paths. Certainly, the plurality of paths may be any number of the at least two paths, which are not limited in the present disclosure. In an embodiment, the first message may be carried in any one of the following messages: PC5-RRC signaling, a PC5 PDCP Control PDU, a PC5 RLC Control PDU, a PC5 MAC CE, or SCI.

It should be noted that the second message is used to indicate the path(s) to be used by the first terminal or the second terminal.

If the second message is used to indicate the path(s) to be used by the first terminal, i.e., the at least one path, the first message and the second message are the same. That is, the second terminal receives a message transmitted by the network device for indicating the at least one path and forwards the message to the first terminal. That is to say, the first message may be a message generated by the network device and forwarded to the first terminal through the second terminal.

If the second message is used to indicate the path(s) to be used by the second terminal, the second terminal needs to determine the at least one path to be used by the first terminal based on the second message. In other words, the second terminal needs to generate the first message based on the second message and transmit the first message to the first terminal. That is, the first message may also be a message generated by the second terminal. Equivalently, the second terminal does not forward a network command, but the network device controls the connection path from the relay to the network based on the second message, causing the second terminal expects the first terminal to control the connection path from the first terminal to the second terminal accordingly. In other words, if the second message is used to indicate the path(s) to be used by the second terminal, the at least one path includes at least a relay path controlled by the first terminal.

At S323, the first terminal performs the data transmission based on the at least one path.

In the embodiment, there is a relay path between the first terminal and the network device. In such case, the second terminal transmits the first message to the first terminal based on the second message transmitted by the network device, so as to use the first message to control the PDCP entity of the first terminal to map data to a bearer including a PC5 connection and/or a bearer (SRB or DRB) including no PC5 connection, thereby realizing the data transmission based on the at least one path.

In some embodiments, the first message is further used for instructing the first terminal to activate or deactivate a PDCP duplication function.

In other words, the first message instructs the first terminal to activate or deactivate the PDCP duplication function while indicating the at least one path.

In some implementations, the first message is used for instructing the first terminal to perform data transmission using at least two paths in the plurality of paths and for instructing the first terminal to activate the PDCP duplication function, and same data is transmitted on different paths of the at least two paths.

In other words, if the at least one path is at least two paths and the PDCP duplication function is activated, the same data is transmitted on different paths of the at least two paths.

In some implementations, the first message is used for instructing the first terminal to perform data transmission using one path or at least two paths in the plurality of paths and for instructing the first terminal to deactivate the PDCP duplication function, and different data is transmitted on different paths of the at least two paths.

In other words, if the at least one path is at least two paths and the PDCP duplication function is deactivated, different data is transmitted on different paths of the at least two paths.

It should be noted that implementation of the first message is not specifically limited in the present disclosure.

For example, as an example, the first message may include 1-bit information. The first message instructs the first terminal to perform data transmission using the plurality of paths and instructs the first terminal to activate the PDCP duplication function if a value of the 1-bit information is 1. The first message instructs the first terminal to perform data transmission using the plurality of paths and instructs the first terminal to deactivate the PDCP duplication function if the value of the 1-bit information is 0. As another example, the first message may include 2-bit information. The first message instructs the first terminal to perform data transmission using two paths in the plurality of paths and instructs the first terminal to activate the PDCP duplication function if a value of the 2-bit information is 10. The first message instructs the first terminal to perform data transmission using two paths in the plurality of paths and instructs the first terminal to deactivate the PDCP duplication function if the value of the 2-bit information is 11. The first message instructs the first terminal to perform data transmission using three paths in the plurality of paths and instructs the first terminal to activate the PDCP duplication function if the value of the 2-bit information is 01. The first message instructs the first terminal to perform data transmission using three paths in the plurality of paths and instructs the first terminal to deactivate the PDCP duplication function if the value of the 2-bit information is 00.

The size of the bit information described above is only an example of the present disclosure and should not be understood as limits to the present disclosure.

For example, in another example, the first message may include first indication information and second indication information simultaneously. The first indication information is used for instructing the first terminal to perform data transmission using at least one path in the plurality of paths, and the second indication information is used for instructing the first terminal to activate or deactivate the PDCP duplication function.

The preferred implementations of the disclosure have been described above in detail with reference to the drawings. However, the disclosure is not limited to specific details in the above implementations. Various simple variations may be made to the technical solutions of the disclosure within the technical conception of the disclosure and shall fall within the scope of protection of the disclosure. For example, the various specific technical features described in the above implementations may be combined in any suitable way without conflict, and the various possible combinations are not described separately in order to avoid unnecessary repetition. For another example, the various implementations of the disclosure may also be combined in any manner without departing from the concept of the disclosure and the resulting technical solutions shall also fall within the scope of protection of the disclosure.

It is also to be understood that, in various method embodiments of the disclosure, a magnitude of a sequence number of each process does not mean an execution sequence and the execution sequence of each process should be determined by its function and an internal logic and should not form any limit to an implementation process of the embodiments of the disclosure. In addition, in the embodiments of the present disclosure, the term "and/or" is only an association relationship describing associated objects and represents that three relationships may exist. For example, A and/or B may represent three conditions: independent existence of A, existence of both A and B, and independent existence of B. In addition, character "/" in the disclosure usually represents that previous and next associated objects form an "or" relationship.

Method embodiments of the present disclosure are described in detail above with reference to FIG. 3 to FIG. 5, and apparatus embodiments of the present disclosure will be described in detail below with reference to FIG. 6 to FIG. 9.

Figure 6:
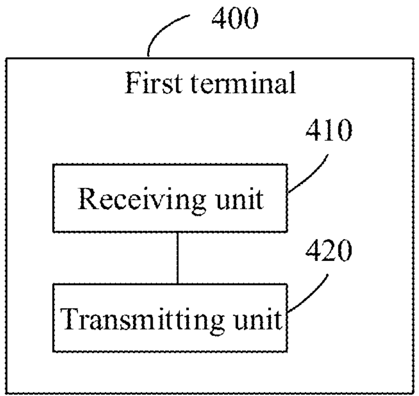
FIG. 6 is a schematic block diagram of a first terminal provided by an embodiment of the present disclosure.

FIG. 6 is a schematic block diagram of a first terminal 400 according to an embodiment of the present disclosure.

As illustrated in FIG. 6, the first terminal 400 may include a receiving unit 410 and a transmitting unit 420.

The receiving unit 410 is configured to receive a first message. The first message is configured for instructing the first terminal to perform data transmission using at least one path in a plurality of paths.

The transmitting unit 420 is configured to perform the data transmission based on the at least one path.

In some embodiments, each of the at least one path is a connection path from the first terminal to a network device.

In some embodiments, the plurality of paths includes a relay path and a direct connection path, the relay path is a path in which the first terminal is connected to the network device through a second terminal, and the direct connection path is a path in which the first terminal is directly connected to the network device; or, the plurality of paths only includes relay paths.

In some embodiments, each of the at least one path is a connection path from the first terminal to the second terminal.

In some embodiments, the receiving unit 410 is specifically configured to receive the first message transmitted by a network device.

In some embodiments, the receiving unit 410 is specifically configured to receive the first message transmitted by a second terminal.

In some embodiments, the first message includes any one of: Radio Resource Control (RRC) signaling, a Packet Data Convergence Protocol (PDCP) Control Protocol Data Unit (PDU), a Radio Link Control (RLC) Control PDU, a Media Access Control (MAC) Control Element (CE), or Downlink Control Information (DCI).

In some embodiments, the first message includes any one of: PC5-RRC signaling, a PC5 PDCP Control PDU, a PC5 RLC Control PDU, a PC5 MAC CE, or Sidelink Control Information (SCI).

In some embodiments, the first message is further used for instructing the first terminal to activate or deactivate a PDCP duplication function.

In some embodiments, the first message is used for instructing the first terminal to perform data transmission using at least two paths in the plurality of paths and for instructing the first terminal to activate the PDCP duplication function, and same data is transmitted on different paths of the at least two paths.

In some embodiments, the first message is used for instructing the first terminal to perform data transmission using one path or at least two path in the plurality of paths and for instructing the first terminal to deactivate the PDCP duplication function, and different data is transmitted on different paths of the at least two paths.

It should be understood that the apparatus embodiments and the method embodiments may correspond to each other and similar descriptions may refer to the method embodiments. Specifically, the first terminal 400 illustrated in FIG. 6 may correspond to the respective entities for performing the method 200, method 310 and method 320 of the embodiments of the present disclosure, and the foregoing and other operations and/or functions of the units in the first terminal 400 respectively implement the corresponding processes in the methods of the present disclosure, which will not be elaborated herein for brevity.

Figure 7:
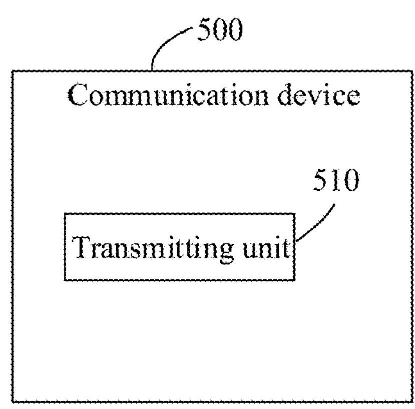
FIG. 7 is a schematic block diagram of a communication device provided by an embodiment of the present disclosure.

FIG. 7 is a schematic block diagram of a communication device 500 according to an embodiment of the present disclosure. For example, the communication device may be a network device or a second terminal.

As illustrated in FIG. 7, the communication device 500 may include a transmitting unit 510.

The transmitting unit 510 is configured to transmit a first message. The first message is configured for instructing a first terminal to perform data transmission using at least one path in a plurality of paths.

In some embodiments, each of the at least one path is a connection path from the first terminal to a network device.

In some embodiments, the plurality of paths includes a relay path and a direct connection path, the relay path is a path in which the first terminal is connected to the network device through a second terminal, and the direct connection path is a path in which the first terminal is directly connected to the network device; or, the plurality of paths only includes relay paths.

In some embodiments, each of the at least one path is a connection path from the first terminal to a second terminal.

In some embodiments, the transmitting unit 510 is specifically configured to transmit the first message to the first terminal.

In some embodiments, the transmitting unit 510 is specifically configured to receive a second message transmitted by a network device, and transmit the first message to the first terminal based on the second message.

In some embodiments, the second message includes any one of: Radio Resource Control (RRC) signaling, a Packet Data Convergence Protocol (PDCP) Control Protocol Data Unit (PDU), a Radio Link Control (RLC) Control PDU, a Media Access Control (MAC) Control Element (CE), or Downlink Control Information (DCI).

In some embodiments, the first message includes any one of: RRC signaling, a PDCP Control PDU, a RLC Control PDU, a MAC CE, or DCI.

In some embodiments, the first message includes any one of: PC5-RRC signaling, a PC5 PDCP Control PDU, a PC5 RLC Control PDU, a PC5 MAC CE, or Sidelink Control Information (SCI).

In some embodiments, the first message is further used for instructing the first terminal to activate or deactivate a PDCP duplication function.

In some embodiments, the first message is used for instructing the first terminal to perform data transmission using at least two paths in the plurality of paths and for instructing the first terminal to activate the PDCP duplication function, and same data is transmitted on different paths of the at least two paths.

In some embodiments, the first message is used for instructing the first terminal to perform data transmission using one path or at least two path in the plurality of paths and for instructing the first terminal to deactivate the PDCP duplication function, and different data is transmitted on different paths of the at least two paths.

It should be understood that the apparatus embodiments and the method embodiments may correspond to each other and similar descriptions may refer to the method embodiments. Specifically, the communication device 500 illustrated in FIG. 7 may correspond to the respective entities for performing the method 200, method 310 and method 320 of the embodiments of the present disclosure, and the foregoing and other operations and/or functions of the units in the communication device 500 respectively implement the corresponding processes in the methods of the present disclosure, which will not be elaborated herein for brevity.

The communication device of the embodiment of the present disclosure is described above from the perspective of functional modules with reference to the accompanying drawings. It should be understood that the functional modules may be implemented in form of hardware, by instructions in form of software, or by a combination of hardware and software modules. In particular, each operation of the method embodiments in the embodiments of the present disclosure may be completed via an integrated logic circuit of hardware in a processor and/or an instruction in a software form. The operations of the method disclosed in combination with embodiments of the present disclosure may be directly embodied to be executed and completed by a hardware decoding processor or executed and completed by a combination of hardware and software modules in the decoding processor. In an example, a software module may be located in a mature storage medium in the art, such as a random access memory (RAM), a flash memory, a read only memory (ROM), a programmable read-only memory (PROM), an electrically erasable PROM (EEPROM) or a register. The storage medium is located in the memory. The processor reads information from the memory and completes the operations of the above method embodiments in combination with hardware of the processor.

For example, each of the receiving unit 410, the transmitting unit 420 and the transmitting unit 510 mentioned above may be implemented by a transceiver.

Figure 8:
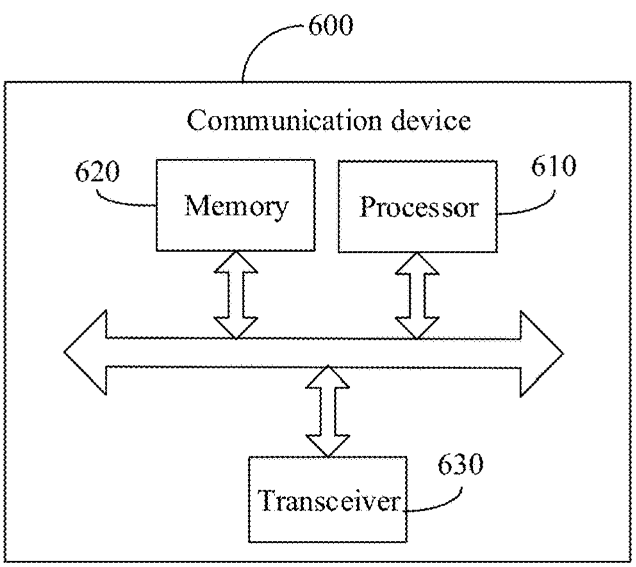
FIG. 8 is another schematic block diagram of a communication device provided by an embodiment of the present disclosure.

FIG. 8 is a schematic structural diagram of a communication device 600 according to an embodiment of the present disclosure.

As illustrated in FIG. 8, the communication device 600 may include a processor 610.

The processor 610 may call and run a computer program from a memory to implement the methods in the embodiments of the present disclosure.

As illustrated in FIG. 8, the communication device 600 may further include a memory 620.

The memory 620 may be used to store indication information and may also be used to store codes, instructions or the like executed by the processor 610. The processor 610 may call and run a computer program from the memory 620 to implement the methods in the embodiments of the present disclosure. The memory 620 may be a separate device independent of the processor 610, or may be integrated into the processor 610.

As illustrated in FIG. 8, the communication device 600 may further include a transceiver 630.

The processor 610 may control the transceiver 630 to communicate with other devices. Specifically, the transceiver 630 may transmit information or data to other devices or receive information or data transmitted by other devices. The transceiver 630 may include a transmitter and a receiver. The transceiver 630 may further include one or more antennas.

It should be understood that the various components in the communication device 600 are connected through a bus system. The bus system includes a power bus, a control bus and a state signal bus in addition to a data bus.

It should be understood that the communication device 600 may be the first terminal in the embodiments of the present disclosure, and the communication device 600 may implement corresponding processes implemented by the first terminal in the methods of the embodiments of the present disclosure. That is to say, the communication device 600 of the embodiment of the present disclosure may correspond to the first terminal 400 in the embodiments of the present disclosure, and may correspond to the corresponding entities for performing the method 200, method 310 and method 320 according to the embodiments of the present disclosure, which will not be elaborated herein for brevity. Similarly, the communication device 600 may be the network device or the second terminal in the embodiments of the present disclosure and may implement corresponding processes implemented by the network device or the second terminal in the methods of the embodiments of the present disclosure. That is to say, the communication device 600 of the embodiment of the present disclosure may correspond to the communication device 500 in the embodiments of the present disclosure, and may correspond to the corresponding entities for performing the method 200, method 310 and method 320 according to the embodiments of the present disclosure, which will not be elaborated herein for brevity.

In addition, an embodiment of the present disclosure further provides a chip.

For example, the chip may be an integrated circuit chip, and the chip has a signal processing capability and may implement or perform the methods, operations and logic diagrams disclosed in the embodiments of the present disclosure. The chip may also be referred to as a system level chip, a system chip, a chip system or an on-chip system chip, etc. In an example, the chip may be applied to various communication devices, causing the communication devices installed with the chip to perform the methods, operations and logic diagrams disclosed in the embodiments of the present disclosure.

Figure 9:
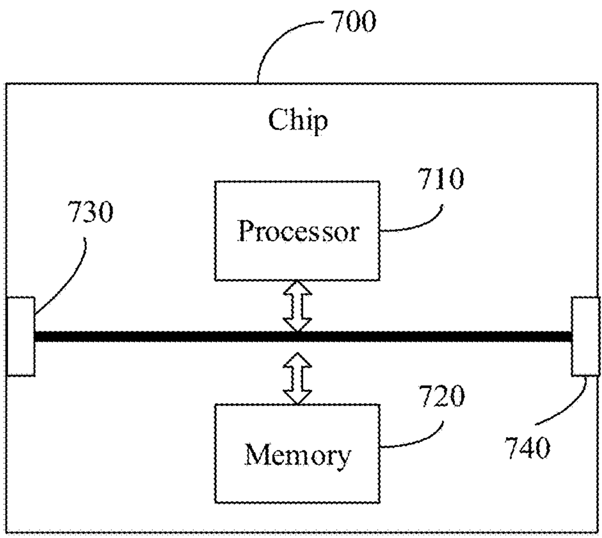
FIG. 9 is a schematic block diagram of a chip provided by an embodiment of the present disclosure.

FIG. 9 is a schematic structural diagram of a chip 700 according to an embodiment of the present disclosure.

As illustrated in FIG. 9, the chip 700 includes a processor 710.

The processor 710 may call and run a computer program from a memory to implement the methods in the embodiments of the present disclosure.

As illustrated in FIG. 9, the chip 700 may further include a memory 720.

The processor 710 may call and run the computer program from the memory 720 to implement the methods in the embodiments of the present disclosure. The memory 720 may be used to store indication information and may also be used to store codes, instructions executed by the processor 710. The memory 720 may be a separate device independent of the processor 710, or may be integrated into the processor 710.

As illustrated in FIG. 9, the chip 700 may further include an input interface 730.

The processor 710 may control the input interface 730 to communicate with other devices or chips, and in particular to obtain information or data transmitted by other devices or chips.

As illustrated in FIG. 9, the chip 700 may further include an output interface 740.

The processor 710 may control the output interface 740 to communicate with other devices or chips, and in particular to output information or data to other devices or chips.

It should be understood that the chip 700 may be applied to the network device or the second terminal in the embodiments of the present disclosure, and the chip may implement the corresponding processes implemented by the network device or the second terminal in the methods of the embodiments of the present disclosure, and may also implement the corresponding processes implemented by the first terminal in the methods of the embodiments of the present disclosure, which will not be elaborated herein for brevity.

It should also be understood that the various components in the chip 700 are connected through a bus system, and the bus system includes a power bus, a control bus and a state signal bus in addition to a data bus.

The processor mentioned above may include, but are not limited to: a general purpose processor, a Digital Signal Processor (DSP), an Application Specific Integrated Circuit (ASIC), a Field Programmable Gate Array (FPGA) or another programmable logical device, discrete gate or transistor logical device and discrete hardware component, etc.

The processor may be configured to implement or perform the methods, operations, and logic diagrams disclosed in the embodiments of the present disclosure. The operations of the method disclosed in combination with the embodiments of the present disclosure may be directly embodied to be executed and completed by a hardware decoding processor or executed and completed by a combination of hardware and software modules in the decoding processor. The software module may be located in a mature storage medium in this field, such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes operations of the above methods in combination with hardware thereof.

The memory mentioned above includes, but is not limited to, a volatile memory and/or a non-volatile memory. The non-volatile memory may be a ROM, a PROM, an Erasable PROM (EPROM), an Electrically EPROM (EEPROM), or a flash memory. The volatile memory may be a RAM used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM) and a Direct Rambus RAM (DR RAM).

It should be noted that the memory described in the disclosure is intended to include memories of these and any other suitable types.

The embodiments of the disclosure also provide a computer-readable storage medium for storing a computer program. The computer-readable storage medium stores one or more programs, and the one or more programs include instructions that, when executed by a portable electronic device including a plurality of application programs, enable the portable electronic device to perform the methods of the embodiments illustrated in the method 200, method 310 and method 320.

In an embodiment, the computer-readable storage medium may be applied to the network device or the second terminal in the embodiments of the present disclosure, and the computer program causes a computer to execute the corresponding processes implemented by the network device or the second terminal in each method according to the embodiments of the present disclosure, which will not be elaborated herein for brevity. In an embodiment, the computer-readable storage medium may be applied to the first terminal in the embodiments of the present disclosure, and the computer program causes the computer to execute the corresponding processes implemented by the first terminal in each method according to the embodiments of the present disclosure, which will not be elaborated herein for brevity.

The embodiments of the disclosure also provide a computer program product including a computer program. When the computer program is executed by a computer, the computer program enables the computer to perform the methods of the embodiments illustrated in the method 200, method 310 and method 320.

In an embodiment, the computer program product may be applied to the network device or the second terminal in the embodiments of the present disclosure, and the computer program causes the computer to execute the corresponding processes implemented by the network device or the second terminal in each method according to the embodiments of the present disclosure, which will not be elaborated herein for brevity. In an embodiment, the computer program product may be applied to the first terminal in the embodiments of the present disclosure, and the computer program causes the computer to execute the corresponding processes implemented by the first terminal in each method according to the embodiments of the present disclosure, which will not be elaborated herein for brevity.

The embodiments of the disclosure also provide a computer program. When the computer program is executed by a computer, the computer program enables the computer to perform the methods of the embodiments illustrated in the method 200, method 310 and method 320.

In an embodiment, the computer program may be applied to the network device or the second terminal in the embodiments of the present disclosure. When the computer program is run on a computer, the computer program enables the computer to execute the corresponding processes implemented by the network device or the second terminal in each method according to the embodiments of the present disclosure, which will not be elaborated herein for brevity. In an embodiment, the computer program may be applied to the first terminal in the embodiments of the present disclosure.

When the computer program is run on a computer, the computer program enables the computer to execute the corresponding processes implemented by the first terminal in each method according to the embodiments of the present disclosure, which will not be elaborated herein for brevity.

The embodiments of the present disclosure also provide a communication system. The communication system may include the above-mentioned terminal device and network device to form the communication system 100 as illustrated in FIG. 1, and will not be elaborated herein for brevity. It should be noted that the term "system" in the disclosure may also be referred to as "network management architecture" or "network system".

It should also be understood that the terms used in the embodiments of the present disclosure and the appended claims are for the purpose of describing specific embodiments only and are not intended to limit the embodiments of the present disclosure. For example, as used in the embodiments of the present disclosure and the appended claims, the singular forms "a", "said" and "the" are intended to include the plural forms as well, unless the context clearly indicates otherwise.

Those skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure. When being realized in form of software functional unit and sold or used as an independent product, the function may be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

Those skilled in the art may clearly learn about that specific working processes of the system, apparatus and unit described above may refer to the corresponding processes in the method embodiment and will not be elaborated herein for convenient and brief description. In some embodiments provided by the disclosure, it is to be understood that the disclosed system, apparatus and method may be implemented in another manner. For example, division of the units or modules or components in the apparatus embodiment described above is only logic function division, and other division manners may be adopted during practical implementation. For example, multiple units or modules or components may be combined or integrated into another system, or some units or modules or components may be neglected or not executed. For another example, the units or modules or components described as separate/displayed parts may or may not be physically separated, and namely may be located in the same place, or may also be distributed to multiple network units. Part or all of the units or modules or components may be selected to achieve the purpose of the embodiments according to a practical requirement. Finally, it is to be noted that coupling or direct coupling or communication connection between each displayed or discussed component may be indirect coupling or communication connection, implemented through some interfaces, of the apparatus or the units, and may be electrical and mechanical or adopt other forms.

The above is only the specific implementation of the embodiments of the disclosure and not intended to limit the scope of protection of the embodiments of the disclosure. Any variations or replacements apparent to those skilled in the art within the technical scope disclosed by the embodiments of the disclosure shall fall within the scope of protection of the embodiments of the disclosure. Therefore, the scope of protection of the embodiments of the disclosure shall be subject to the scope of protection of the claims.

The invention claimed is:

1. A method for wireless communication, comprising:

receiving, by a first terminal, a first message from a second terminal, the first message being configured for instructing the first terminal to perform data transmission using at least one path in a plurality of paths and instructing the first terminal to activate or deactivate a Packet Data Convergence Protocol (PDCP) duplication function; and performing the data transmission based on the at least one path.

2. The method of claim 1, wherein each of the at least one path is a connection path from the first terminal to a network device.

3. The method of claim 2, wherein the plurality of paths comprises a relay path and a direct connection path, the relay path is a path in which the first terminal is connected to the network device through the second terminal, and the direct connection path is a path in which the first terminal is directly connected to the network device; or, the plurality of paths only comprises relay paths.

4. The method of claim 1, wherein the first message comprises any one of:

Radio Resource Control (RRC) signaling, a Media Access Control (MAC) Control Element (CE), or Downlink Control Information (DCI).

5. The method of claim 1, wherein the first message is configured for instructing the first terminal to perform the data transmission using at least two paths in the plurality of paths and for instructing the first terminal to activate the PDCP duplication function, and same data is transmitted on different paths of the at least two paths.

6. The method of claim 1, wherein the first message is configured for instructing the first terminal to perform the data transmission using one path or at least two path paths in the plurality of paths and for instructing the first terminal to deactivate the PDCP duplication function, different data is transmitted on different paths of the at least two paths.

7. The method of claim 1, wherein the first terminal is a remote terminal.

8. A first terminal, comprising: a processor and a memory for storing a computer program, wherein the processor is configured to call and run the computer program stored in the memory to cause the first terminal to:

receive a first message from a second terminal, the first message being configured for instructing the first terminal to perform data transmission using at least one path in a plurality of paths and instructing the first terminal to activate or deactivate a Packet Data Convergence Protocol (PDCP) duplication function; and perform the data transmission based on the at least one path.

9. The first terminal of claim 8, wherein each of the at least one path is a connection path from the first terminal to a network device; and the plurality of paths comprises a relay path and a direct connection path, the relay path is a path in which the first terminal is connected to the network device through the second terminal, and the direct connection path is a path in which the first terminal is directly connected to the network device.

10. The first terminal of claim 8, wherein the first message is configured for instructing the first terminal to perform the data transmission using at least two paths in the plurality of paths and for instructing the first terminal to activate the PDCP duplication function, and same data is transmitted on different paths of the at least two paths.

11. The first terminal of claim 8, wherein the first message is configured for instructing the first terminal to perform the data transmission using one path or at least two paths in the plurality of paths and for instructing the first terminal to deactivate the PDCP duplication function, different data is transmitted on different paths of the at least two paths.

12. A communication device, comprising: a processor and a memory for storing a computer program, wherein the processor is configured to call and run the computer program stored in the memory to cause the communication device to:

transmit a first message to a first terminal, the first message being configured for instructing the first terminal to perform data transmission using at least one path in a plurality of paths and instructing the first terminal to activate or deactivate a Packet Data Convergence Protocol (PDCP) duplication function.

13. The communication device of claim 12, wherein each of the at least one path is a connection path from the first terminal to a network device; and wherein the plurality of paths comprises a relay path and a direct connection path, the relay path is a path in which the first terminal is connected to the network device through the communication device, and the direct connection path is a path in which the first terminal is directly connected to the network device; or, the plurality of paths only comprises relay paths.

14. The communication device of claim 12, wherein the first message is configured for instructing the first terminal to perform the data transmission using at least two paths in the plurality of paths and for instructing the first terminal to activate the PDCP duplication function, and same data is transmitted on different paths of the at least two paths; or, the first message is configured for instructing the first terminal to perform the data transmission using one path or at least two paths in the plurality of paths and for instructing the first terminal to deactivate the PDCP duplication function, different data is transmitted on different paths of the at least two paths.

* * * * *